United States Patent
Morita et al.

(10) Patent No.: US 6,876,924 B2
(45) Date of Patent: Apr. 5, 2005

(54) VEHICLE NAVIGATION SYSTEM

(75) Inventors: Hiroyuki Morita, Saitama (JP); Mutsumi Katayama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/098,392

(22) Filed: Mar. 18, 2002

(65) Prior Publication Data

US 2003/0046000 A1 Mar. 6, 2003

(30) Foreign Application Priority Data

Mar. 22, 2001 (JP) .................................. 2001-083182

(51) Int. Cl.[7] .............................................. G01C 21/00
(52) U.S. Cl. .................................... 701/211; 701/213
(58) Field of Search .............................. 701/211, 200, 701/201, 202, 207, 208, 209, 210, 212, 213; 340/990, 995

(56) References Cited

U.S. PATENT DOCUMENTS

| | | | |
|---|---|---|---|
| 5,587,911 A | * 12/1996 | Asano et al. | 701/202 |
| 6,009,355 A | * 12/1999 | Obradovich et al. | 701/1 |
| 6,120,159 A | * 9/2000 | Inoguchi et al. | 362/29 |
| 6,157,297 A | * 12/2000 | Nakai | 340/461 |
| 6,224,222 B1 | * 5/2001 | Inoguchi et al. | 362/29 |
| 6,249,744 B1 | * 6/2001 | Morita | 701/213 |
| 6,421,606 B1 | * 7/2002 | Asai et al. | 701/209 |

FOREIGN PATENT DOCUMENTS

| | | |
|---|---|---|
| JP | 10122885 A | 5/1998 |
| JP | 11014391 A | 1/1999 |
| JP | 11321754 A | 11/1999 |

* cited by examiner

*Primary Examiner*—Thomas G. Black
*Assistant Examiner*—Christine M. Behncke
(74) *Attorney, Agent, or Firm*—Birch, Stewart, Kolasch & Birch, LLP

(57) ABSTRACT

A vehicle navigation system that uses a portable information terminal. The navigation system displays route guidance information by receiving GPS satellite radio waves, and includes a navigation unit that generates route guidance information, a meter panel of a meter unit, which displays only part of the route guidance information, and a display panel of the navigation unit, which displays every selected item of the route guidance information. The meter panel of the meter unit is disposed within the visual field of the driver when in driving the vehicle. On the other hand, the display panel of the navigation unit is disposed outside of the visual field of the driver when driving the vehicle. The resulting configuration provides a vehicle navigation system that provides the driver with the minimum necessary information when driving, and provides additional detailed information when needed, combined in a system that affords excellent operability.

20 Claims, 11 Drawing Sheets

VEHICLE NAVIGATION SYSTEM

CROSS-REFERENCE TO RELATED APPLICATIONS

The present application claims priority under 35 U.S.C. §119 to Japanese Patent Application No. 2001-083182, filed on Mar. 22, 2001, the entire contents thereof are hereby incorporated by reference.

BACKGROUND OF THE INVENTION

1. Field of the Invention

The present invention relates to a vehicle navigation system. More particularly, the present invention relates to a vehicle navigation system that uses a portable information terminal (hereinafter, to be referred to as "PDA").

2. Description of Background Art

In recent years, many vehicles use vehicle navigation systems that guide the drivers to their goals on a map on which the current position of the vehicle is displayed respectively. Such navigation systems are realized by combining a global positioning system (GPS) and map information.

Conventionally, vehicle navigation systems have been developed mainly for four-wheel cars. In recent years, however, it is under examination whether or not it is possible to install these systems also in small cars such as auto-bicycles, irregular ground buggies, etc. For example, the official gazette of Published Unexamined Patent Application No. 11-321754 discloses an auto-bicycle in which a navigation system is installed.

Conventional navigation systems have employed large display screens so as to provide the drivers with as much information as possible. For such small vehicles as auto-bicycles, etc., therefore, it has been difficult to secure a space for mounting such a display panel in the visual field of the driver.

In order to solve such the technical problem, the official gazette of Published Unexamined Patent Application No. 11-14391 or No. 10-122885 proposes a method that displays only the minimum necessary information, such as a direction of and a distance to a goal, in a small area of the vehicle meter panel as in a small portable GPS unit.

According to the above-described conventional techniques, operation switches must be disposed in a limited area on or around the meter panel, making the units difficult to operate. This, then, presents another problem with conventional devices.

In addition, because it is difficult to provide the driver with enough information on the above-described rough display, the navigation system must be able to prepare a dedicated map on which longitude and latitude lines are described in detail, and further, must also provide a portable GPS unit to let the driver know his/her current position with accuracy.

Under such circumstances, it is an object of the present invention to provide a vehicle navigation system with excellent operability that can provide the driver with the minimum necessary route guidance information when driving the vehicle, thus solving the conventional technical problems described above.

SUMMARY AND OBJECTS OF THE INVENTION

In order to achieve the above object, the vehicle navigation system of the present invention that displays route guidance information by receiving GPS satellite radio waves is provided with following means:

(1) A first display block that displays only part of route guidance information, and a second display block that displays every selected item of the route guidance information.

(2) A first display block that displays the route guidance information roughly, and a second display block that displays the route guidance information in detail.

According to the features described in (1) and (2), the first display block displays only indispensable information selected from among the mass of route guidance information items, while the second display block displays other information items and detailed information. As a result, the space of the first display block can be minimized. Consequently, the first display block can be disposed in the visual field of the driver with no obstacle between them, and the second display block can be formed so as to display detailed information that will overflow the first display block.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
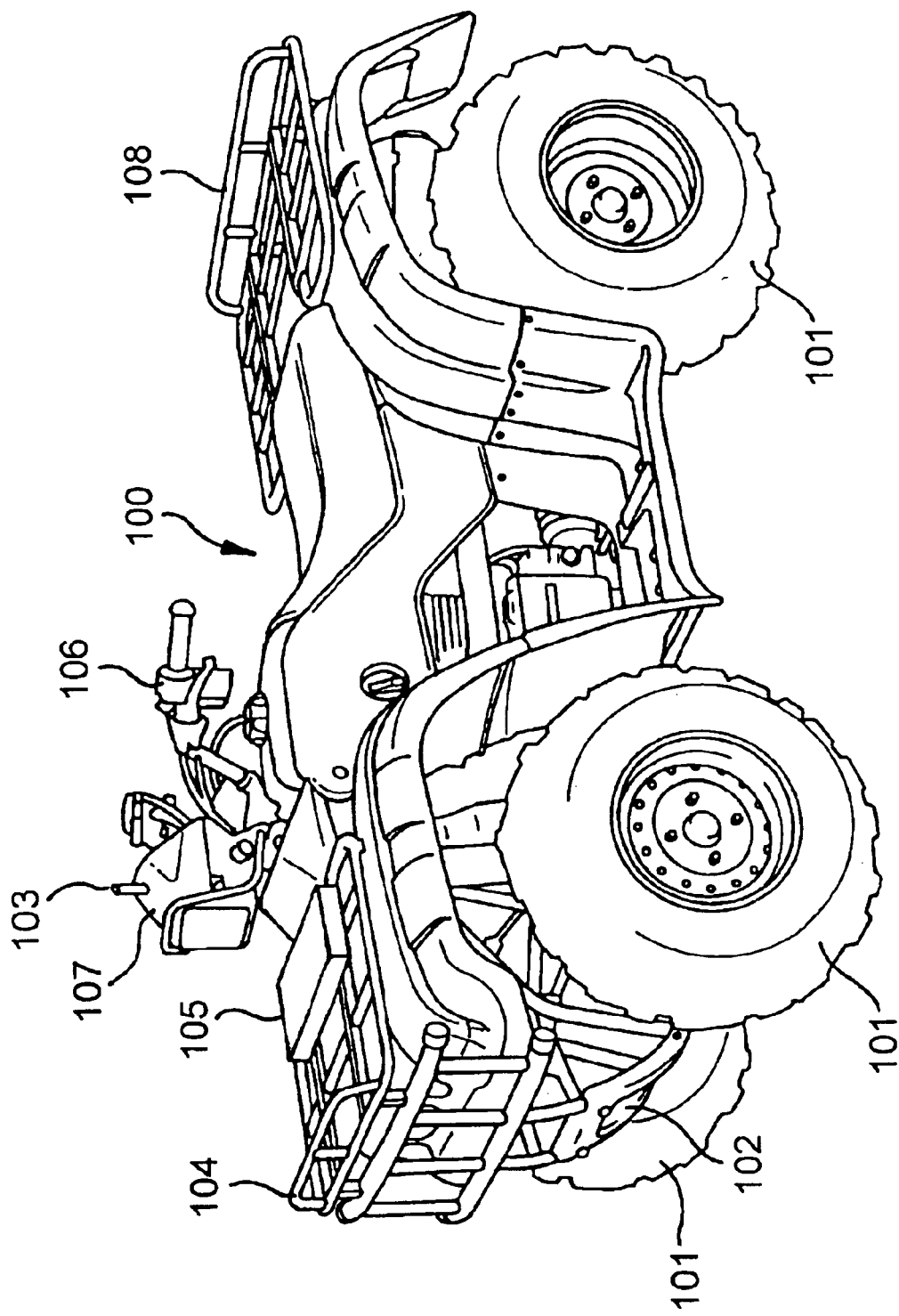
FIG. 1 is a perspective view of an astride type buggy car used for irregular grounds, with a vehicle navigation system of the present invention installed therein.

Hereinafter, an example of the present invention will be described in detail with reference to the accompanying drawings. FIG. 1 shows a perspective view of an astride type buggy car 100 used for irregular grounds. The vehicle navigation system of the present invention is installed in the buggy car 100. The buggy car 100 provided with large-diameter wheels 101, an under-cover 102, a four-wheel driving mechanism, etc., is excellent in hill-climbing and running properties.

A meter unit 107 is disposed in the center of handlebars 106 and a helical GPS receiving antenna 103 is erected from the top of the meter unit 107. Since the astride type buggy car 100 is often used on irregular grounds, the car 100 changes its posture bewilderingly when in a running state. For this reason, a helical receiving antenna 103 with a wide orientation is employed. With a helical receiving antenna, GPS radio waves can be received satisfactorily regardless of the posture changes of the vehicle.

A front carrier 104 and a rear carrier 108 are disposed at the front side and at the rear side of the car 100 respectively. A navigation box 105 (to be described later) is mounted in the backward upper portion of the front carrier 104.

Figure 2:
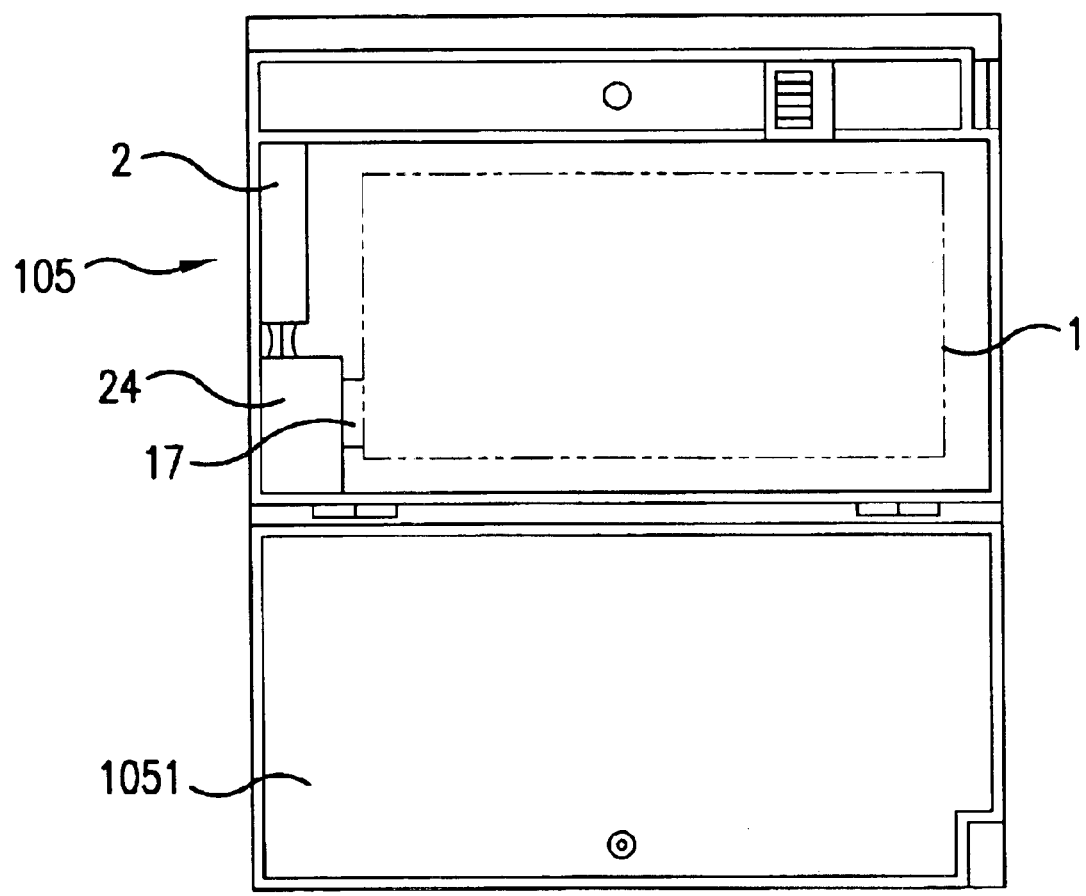
FIG. 2 is a navigation box with its cover opened.

FIG. 2 shows a navigation box 105 with its cover 1051 opened. A cushion material (not shown) is put up all over the inner walls of the box 105 and a navigation unit 1 is housed in the box 105. This navigation unit 1 is a portable information terminal, such as a portable PDA (Personal Digital Assistant), a lap-top PC, or the like in which a navigation program is downloaded.

A relay unit 2 is connected to the navigation box 105. The relay unit 2 includes a multiple-pole connector 24 at one end. The connector 24 is connected/disconnected to/from an I/O port 17 of the navigation unit 1. The navigation unit 1 can be removed from the navigation box 105 by disconnecting the connector 24 of the relay unit 2 from the I/O port 17 and unfastening a predetermined fastening mechanism.

Consequently, the navigation unit 1 can be connected to the connector 24 so as to be used as a navigation system when in driving. Alternatively, the navigation unit 1 can be disconnected from the connector 24 so as to be used as a normal portable information terminal in other occasions.

Furthermore, when this portable information terminal is combined with a handy GPS or GPS smart antenna, or when a GPS-installed PDA is employed as the navigation unit 1, the terminal can be used as a small GPS unit.

The navigation box 105 should preferably have a size large enough to house a PDA, a lap-top PC, and A4/B5-size regular files.

In this example, the navigation unit 1 is housed in the navigation box 105 so that it is secure from robbery. Also, when appropriate, however, the unit can be removed from the box and used as a portable unit. The navigation unit 1 is also usable as a multi-function information terminal. As such, it can be used to store address lists, and dictionaries, etc.

Because an electrical junction between the navigation unit 1 and the navigation box 105 is located in the box 105, it is protected from contamination and damages by rain, wind, dust, and other elements.

Figure 3:
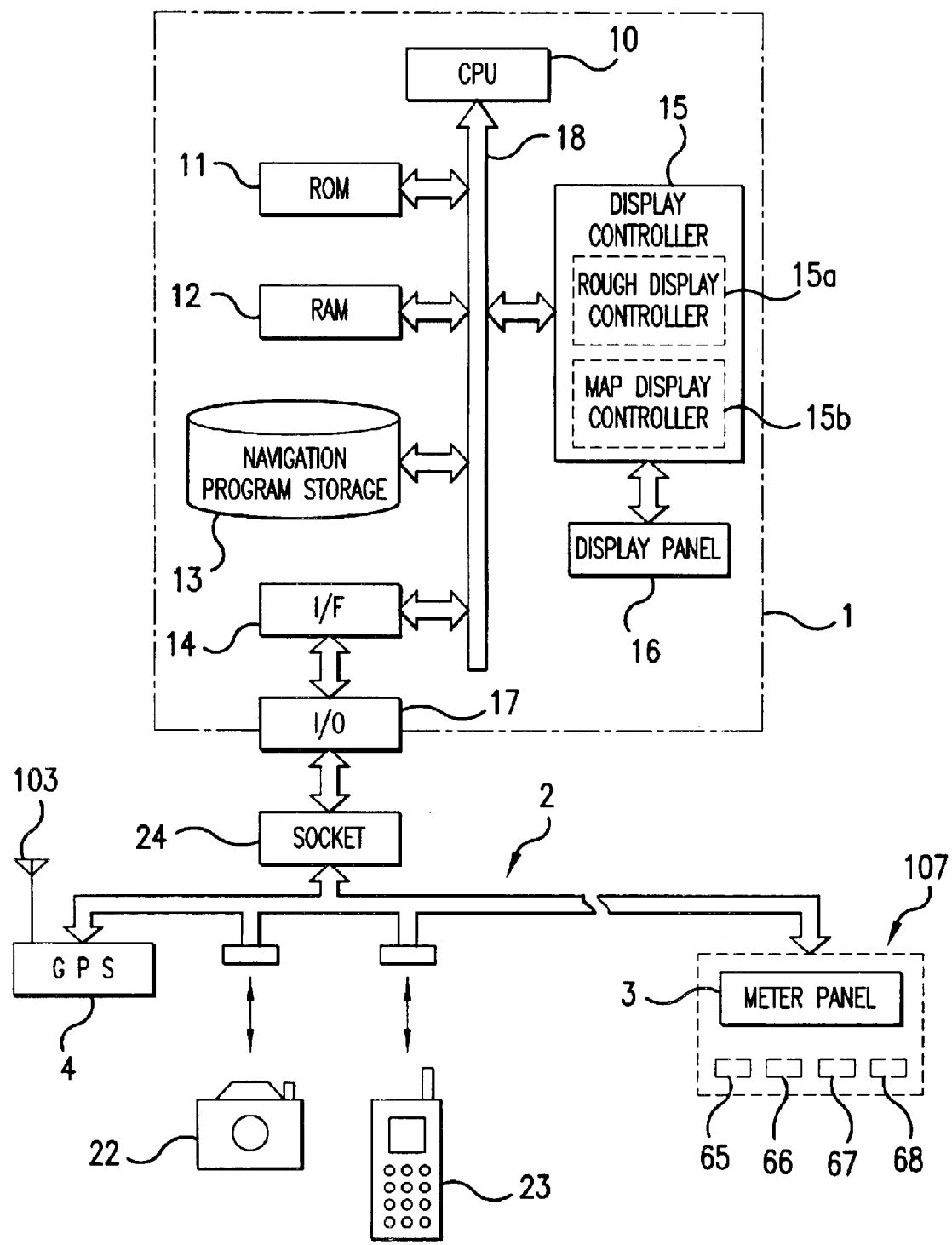
FIG. 3 is a block diagram of a navigation system.

FIG. 3 shows a block diagram of a navigation system installed in the astride type buggy car 100. The same reference numerals are given to the same components as those described above.

The navigation system in this example includes a portable navigation unit 1 housed in the navigation box 105; a meter panel 3 that roughly displays part of route guidance information obtained from the navigation system; a relay unit 2 for connecting the navigation unit 1 to the meter panel 3; and a GPS receiver 4 that receives GPS radio waves via a receiving antenna 103 and translates received waves to electrical signals.

In the navigation unit 1, the navigation program storage 13 stores a navigation program. A CPU 10 executes the navigation program under the control of a control program stored in a ROM 11. A RAM 12 is used as a work area of the CPU 10.

A display controller 15 includes a rough display controller 15a and a map display controller 15b. The meter panel 3 of the meter unit 107 receives only the minimum necessary rough information, such as a direction of and a distance to each goal among the various kinds of route guidance information items obtained in accordance with the execution of the navigation program via an interface 14, the I/O port 17, and the relay unit 2.

The map information controller 15b displays all the selected route guidance information items, such as detailed map information, etc., obtained in accordance with the execution of the navigation program.

The relay unit 2 includes connection terminals for a digital camera 22 and a portable phone/PHS 23. The relay unit 2 functions as a data path between the navigation unit 1 and the meter panel 3/GPS receiver 4. Relay unit 2 also functions to transfer image data photographed by the digital camera 22 to the navigation unit, and further, functions to transfer data collected by the navigation unit 1 from a portable phone/PHS 23 to a predetermined base station through radio communications.

Figure 4:
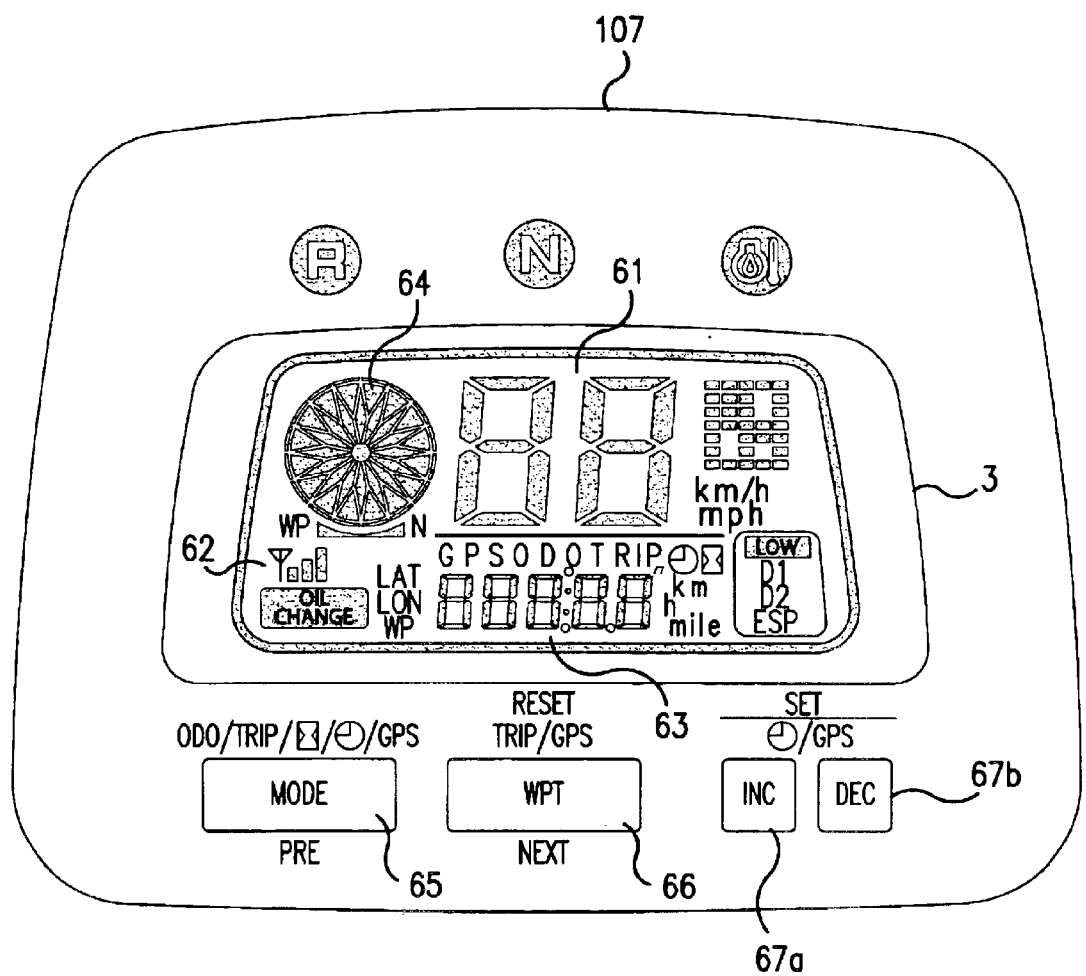
FIG. 4 is a top view of a display panel in a configuration.

FIG. 4 shows a top view of the meter panel 3 of the meter unit 107 in a configuration. The meter panel 3 includes a speed display area 61; a running distance display area 63 that functions as both of an odometer and a trip meter; a sensitivity display area 62 used to display the receiving status of the GPS radio waves; and a direction display area 64 used to display a direction of a relay point (way point: WP) roughly in 16 points. The running distance display area 63 displays a rough distance up to a way point WP exclusively from the running distance.

The meter panel 3 further includes a "MODE" switch 65 used to switch among operation modes of the navigation system; a "WPT" switch 66 used to register the current position of the subject car as a new way point WP; and an "INC" switch 67a and a "DEC" switch 67b used to select a desired WP from among a plurality of registered WPs. Other display items are not necessary to understand the present invention, so the description for them will be omitted here.

When the navigation system in such a configuration is powered, the navigation program in the navigation unit 1 is started up. The navigation system then begins route guidance. When in a running state, the meter unit 107 displays the minimum necessary route guidance information such as the direction of and the distance to a currently selected way point WP. The meter unit 107 also receives sensitivity status of the GPS radio waves among various kinds of guidance information items, received from the display controller 15 and the rough display controller 15a.

Figure 5:
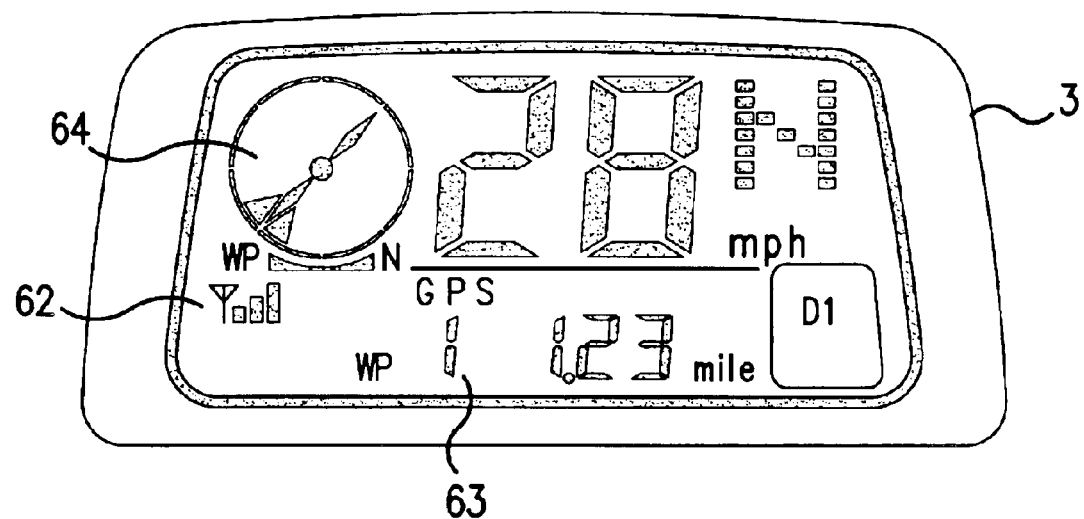
FIG. 5 is a display example of a meter panel.

As shown in FIG. 5, meter panel 3 of the meter unit 107 displays the receiving sensitivity status in the sensitivity display area 62, an identification number "1" of the way point WP and a distance "1,23 (miles)" up to the way point WP1 in the running distance display area 63, and a direction of the way point WP1 in the direction display area 64 respectively, according to the received information.

On the other hand, when the driver wants to refer to further detailed map information, the driver can stop the car and open the navigation box 105 to start up the detailed display of the navigation unit 1.

Figure 6:
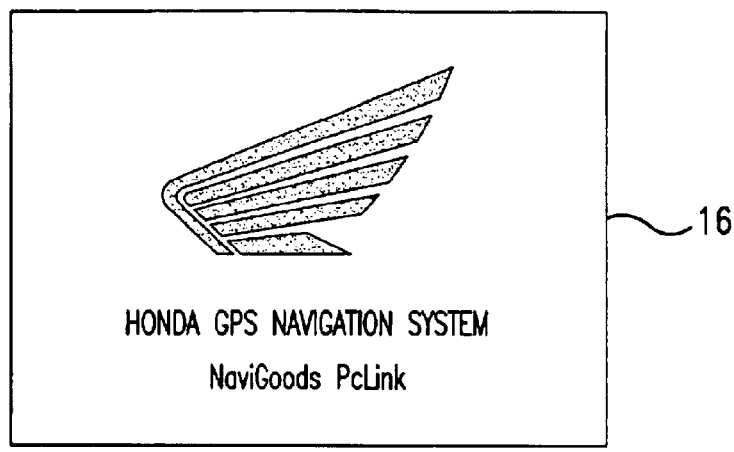
FIG. 6 is a display example (title screen) of a display panel of a navigation unit.
Figure 7:
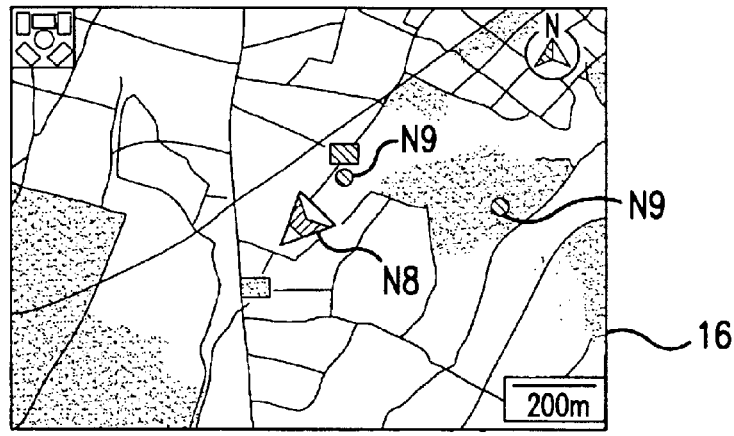
FIG. 7 is a display example (map guidance screen) of the display panel of the navigation unit.

The display panel 16 of the navigation unit 1 displays a title screen as shown in FIG. 6, then a map navigation screen with a running trace as shown in FIG. 7. An arrow N8 in FIG. 6 denotes a position and running direction of the subject car and the running trace is displayed with a dot N9.

Figure 8:
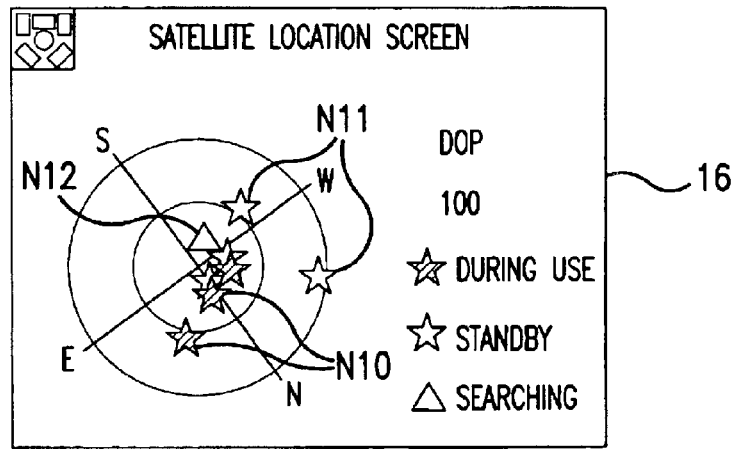
FIG. 8 is a display example (satellite location screen) of the navigation unit.
Figure 9:
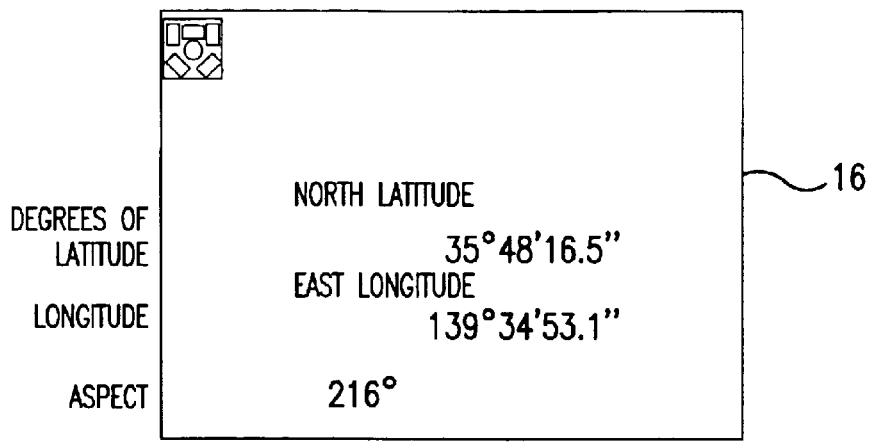
FIG. 9 is a display example (latitude/longitude display screen) of the navigation unit.

The display panel 16 can also display a satellite location map as shown in FIG. 8, as well as both longitude and latitude lines for denoting the position of the car as shown in FIG. 9 in accordance with the driver's operation of the navigation unit 1.

The route guidance that uses way points as described above will therefore be especially effective when the buggy car 100 is dispatched to a disaster-stricken site for state checking, or to a recovery works, for example.

Often, rescue members, etc. dispatched to a disaster-stricken site/recovery working site may not be familiar with geographical information of the area. In addition, when the disaster is a serious one, the scene might be changed completely, making it difficult to identify the target position accurately. At such a disaster-stricken site, the rescue staff may be required to take an unavoidable detour route on the way back, since the outward traffic may be blocked.

Even in such a case, on the way back the driver will be able to refer to the direction display area 64 and the running distance display area 63 on the meter panel 3 to easily recognize both the distance to, and the direction of, each way point registered on the way forward. The driver can thus return to each way point on the way back, then to the starting point via the detour route.

Furthermore, when it is difficult for the driver to go to a way point displayed in the direction display area 64 of the meter panel 3, the driver can refer to the detailed map information displayed on the display panel 16 of the navigation unit 1. With this capability, the driver can examine detour routes to each way point, and determine the way back to the starting point.

Figure 10:
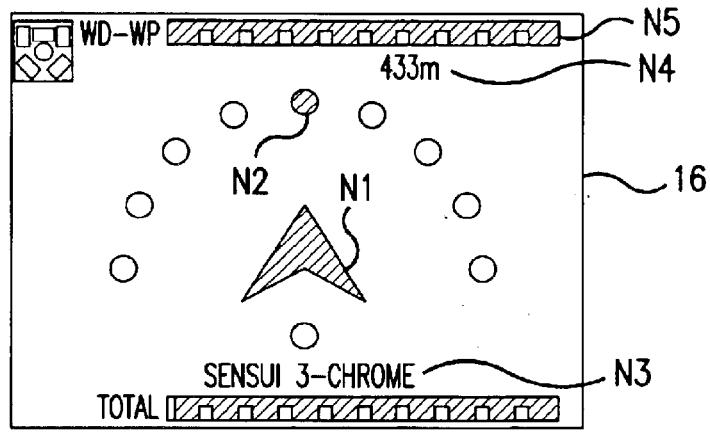
FIG. 10 is a display example (guidance with arrows display screen) of the navigation unit.
Figure 11:
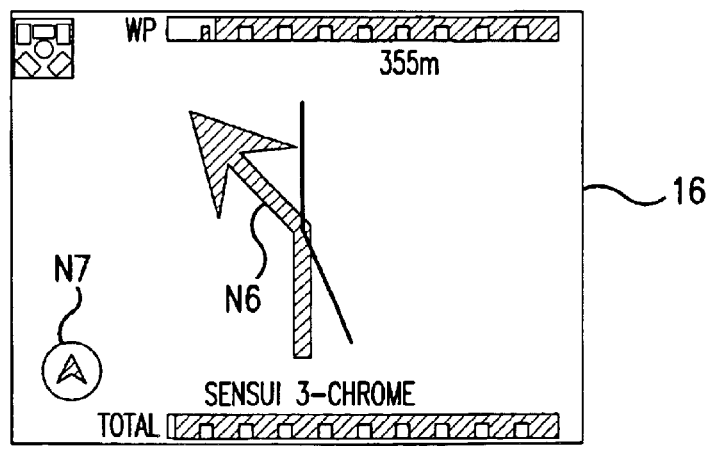
FIG. 11 is a display example (framed map guidance screen) of the navigation unit.

On the other hand, when the driver removes the navigation unit 1 from the navigation box 105 and carries it with him/her, either a guidance screen with arrows as shown in FIG. 10, or a framed map guidance screen as shown in FIG. 11, can be displayed.

The guidance screen with arrows shown in FIG. 10 displays an arrow N1 and a dot mark N2 for denoting the direction of a way point; a way point name N3; a long-range distance number N4 up to the way point N4; and a graphic item N5 that displays a distance up to the way point N4 as a bar graph. The framed map guidance screen shown in FIG. 11 displays a large arrow N6 for both way point shape and moving direction and a small arrow N7 for the direction of each way point.

When a general-purpose portable PDA used as the navigation unit 1 is connected to the navigation system removably and used for the irregular ground buggy car 100, the system will be used more effectively at disaster-stricken sites/recovery working sites.

Generally, when the buggy car 100 is sent out to a disaster-stricken site, image data of the site photographed by the digital camera 22 is transferred to the navigation unit 1 via the relay unit 2. The navigation unit 1 transfers image data with position and date/time information of the photographed site added thereto to the headquarters, etc., from the portable phone/PHS 23 by using its own navigation function. Consequently, the necessary information can be recognized quickly and in detail.

Information related to the photographing date and time can be added to the image data so that the trace data stored in the navigation system, and thus the date-and-time information can be collated with each other. This feature is useful, for instance, in identifying the photographing point.

In this example, the navigation unit 1 can be removed from the vehicle body and carried by a rescue member. As such, it is possible to drive the buggy car 100 up to a place close to the target site, and remove the navigation unit 1 from the car 100, so that the rescue member can carry the unit 1 with him/her to go to the site. The removed navigation unit 1 may be connected to a general-purpose PDA and a handy GPS/GPS smart antenna, or to a GPS-installed PDA so that the navigation unit 1 is provided with all the navigation functions. The user can thus go forward under the guidance of the navigation system and send the disaster-stricken site image photographed by the digital camera 22 to the headquarters as in the case described above.

While the navigation box 105 is mounted on the front carrier 104 of the vehicle 100 in the above example, the navigation box 105 may be mounted on the rear carrier 108 or around the driver's seat.

In this example, the system is provided with two display panels that share the main functions of the navigation system. The meter panel 3 of the vehicle displays only the minimum necessary information, such as the direction of and the direction to each relay point (WP), and the GPS wave receiving sensitivity status for the driver. It is thus possible to reduce the display space. On the other hand, because the display panel 16 of the navigation unit 1 housed in the navigation box 105 can display detailed map information, the driver can obtain both of rough and detailed information items.

Furthermore, according to this example, the navigation unit 1 can be removed from the vehicle, so that the navigation unit 1 can be used effectively.

Figure 12:
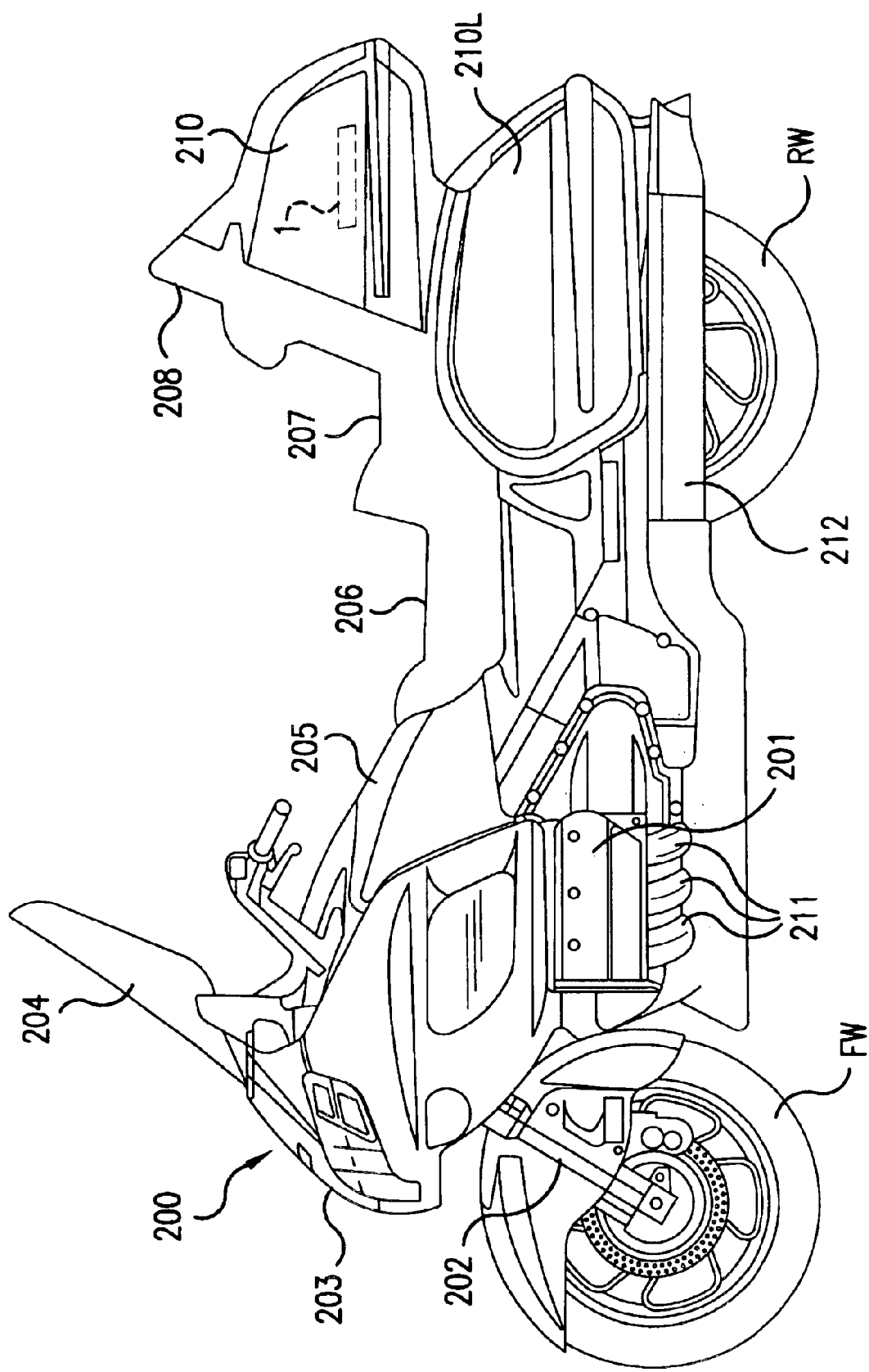
FIG. 12 is a side view of an auto-bicycle in which the navigation system of the present invention is installed.

FIG. 12 shows a side view of an auto-bicycle 200 in which the navigation system of the present invention is installed.

The vehicle in this example includes a horizontally opposed 6-cylinder engine 201. An exhaust manifold 211 is led out from the engine 201 to the rear and this exhaust manifold 211 is connected to a muffler 212.

The front wheel FW is supported rotationally at the lower end of a front fork 202. The front part of the vehicle is covered by a front fairing (cowl) 203 and a wind screen 204 is provided on the top surface. The driver's seat 206 and a fellow passenger seat 207 are disposed in the rear of a fuel tank 205.

The fellow passenger seat 207 with a back rest 208 is united with the driver's seat 206. A rear trunk 210 is provided at the rear side of the back rest 208. Side trunks 210L and 210R are provided in the lower portion of the rear trunk 210 and at the both sides of the rear wheels RW. In this example, the navigation unit 1 is housed in the rear trunk 210.

Figure 13:
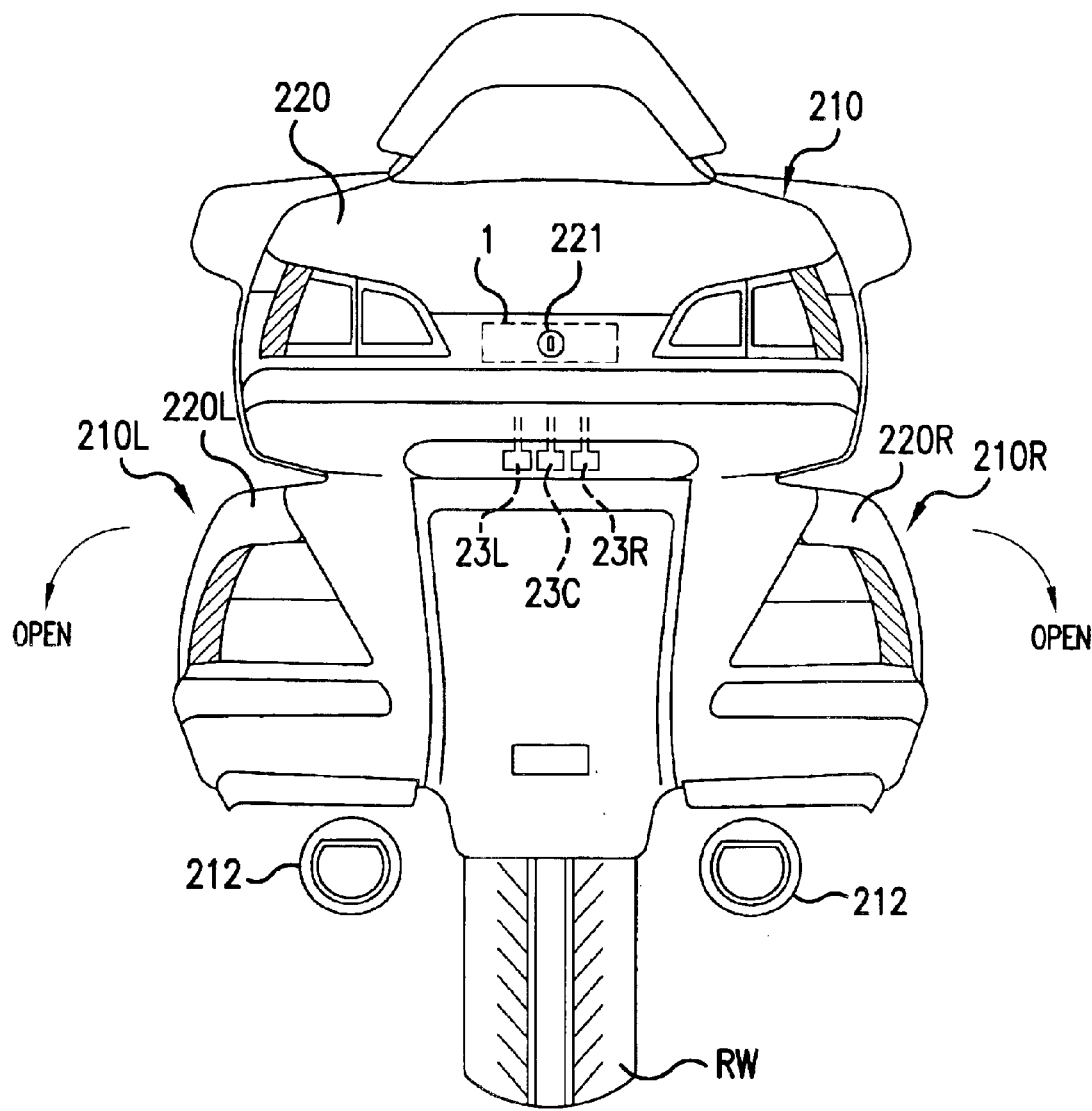
FIG. 13 is a rear front view of the auto-bicycle shown in FIG. 12.

FIG. 13 shows a rear front view of the vehicle 200. In FIG. 13, the same reference numerals are given to the same and equivalent items described above.

In this vehicle, the cover of the trunk 210 is opened upward and the covers 220L and 220R of the side trunks 210L and 210R are opened to the side respectively. Each of the trunks 210, 210L, and 210R are locked/unlocked by turning an engine key inserted in a key cylinder 221 located at the trunk 210.

Three opening/closing levers 23L, 23C, and 23R are provided in the lower portion of the rear trunk 210. Each of those levers 23L, 23C, and 23R is operated after the rear trunk 210 is unlocked so as to open the cover 220L of the side trunk 210L, the cover 220 of the rear trunk 210, and the cover 220R of the side trunk 210R.

Figure 14:
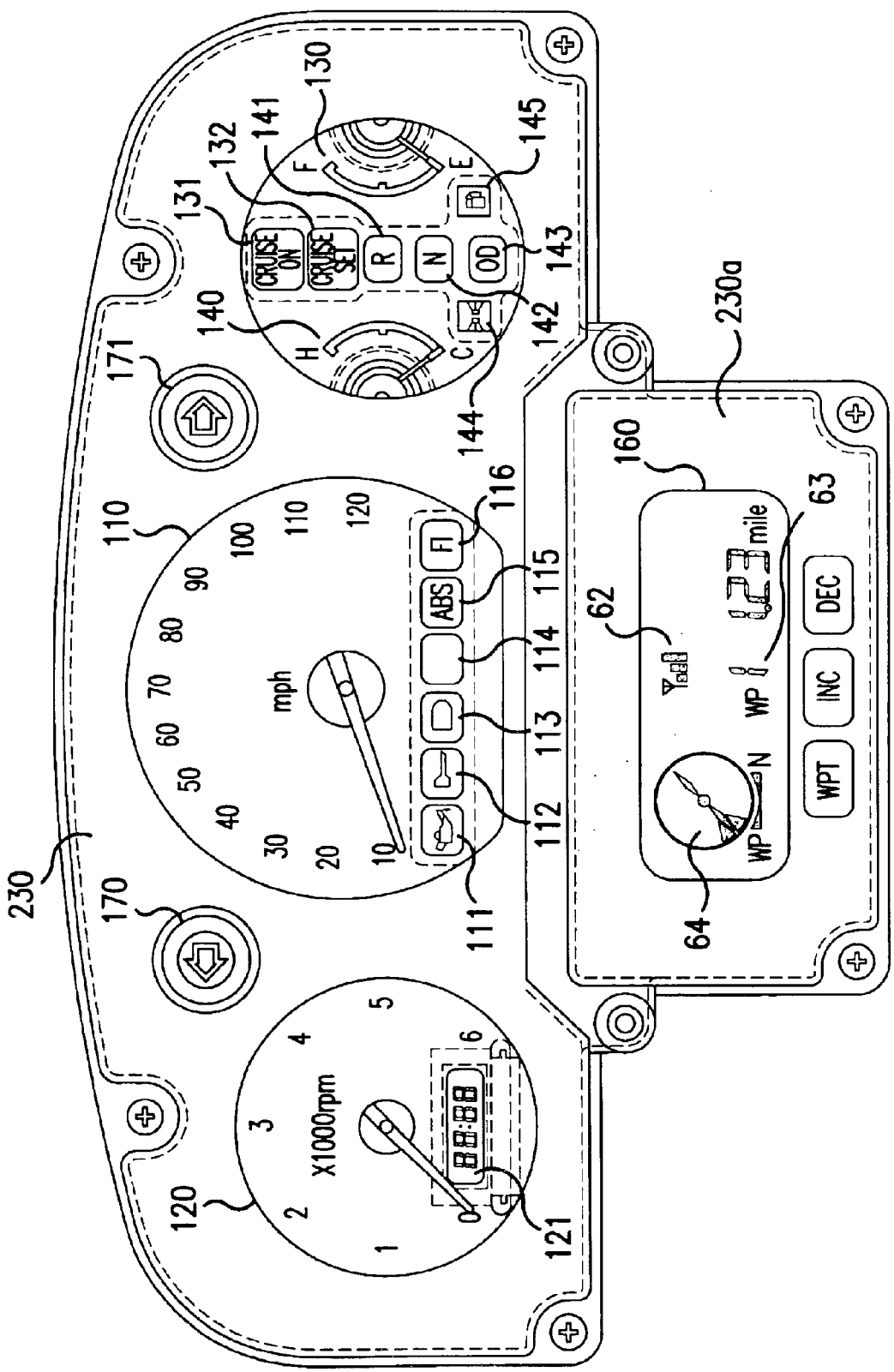
FIG. 14 is a top view of a meter panel of the auto-bicycle shown in FIG. 12.

FIG. 14 shows a top view of the meter panel 230 of the auto-bicycle 200 from the driver's seat 206 side. A GPS rough display block 230a is united with the meter panel 230 in the lower portion of the panel 230.

A speed meter 110 is provided in the center of the meter panel 230 and a tachometer 120 is provided at the left side of the speed meter. And, a fuel gauge 130 and an engine temperature gauge 140 are disposed at the right of the speed meter 110 respectively. Winker indicators 170 and 171 are disposed at both sides above the speed meter 110.

At the speed meter 110 are disposed an oil indicator 111, a security indicator 112, a high beam indicator light 113, a light volume sensor 114 for the meter 110, an ABS (Anti-lock Braking System) warning light 115, and an FI (fuel injection) warning light 116 together. An auto-cruising indicator light 131 and an auto-cruising set indicator light 132, a transmission reverse indicator light 141, a neutral indicator light 142, and an over-drive indicator light 143 are disposed in a vertical line between the fuel indicator 130 and the engine temperature gauge 140.

Furthermore, a light blink indicator 144 is disposed at the left side of each indicator light of the transmission and a fuel empty indicator 145 is disposed at the right side. A clock 121 is disposed in the lower portion of the tachometer 120.

A sub-panel 160 is disposed in the center of the GPS rough display block 230a and the "WPT" switch, the "INC" switch, and the "DEC" are disposed in the lower portion of the block 230a just like the buggy car 100.

Figure 15:
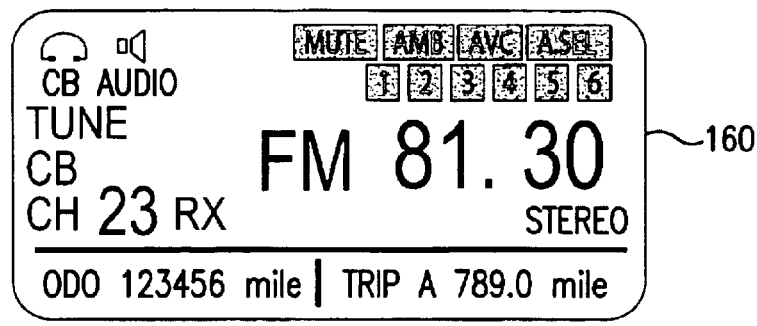
FIG. 15 is a display example (radio operation screen) of the sub-panel.
Figure 16:
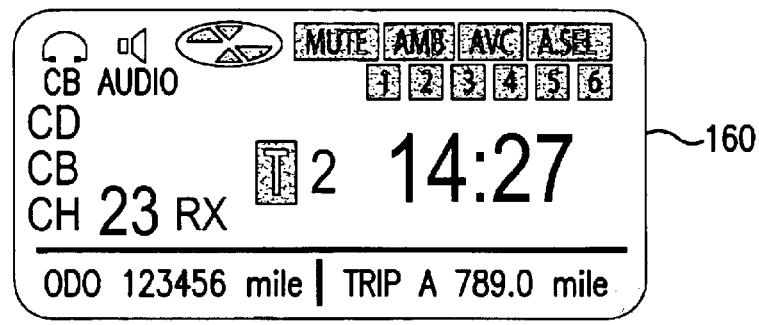
FIG. 16 is a display example (audio operation screen) of the sub-panel.

On the sub-panel 160 of the auto-bicycle 200, the sensitivity display area 62 displays the receiving sensitivity status of the GPS radio waves, in a manner similar to that in the buggy car 100. The direction display area 64 displays the direction of a way point, and the running distance display area 63 displays "1" as an identification number of the way point and "1.23 (miles)" as the distance up to the way point WP respectively. When the navigation system operation is disabled, the sub-panel 160 displays the radio operation screen shown in FIG. 15, or alternatively, the audio operation screen shown in FIG. 16.

Figure 17:
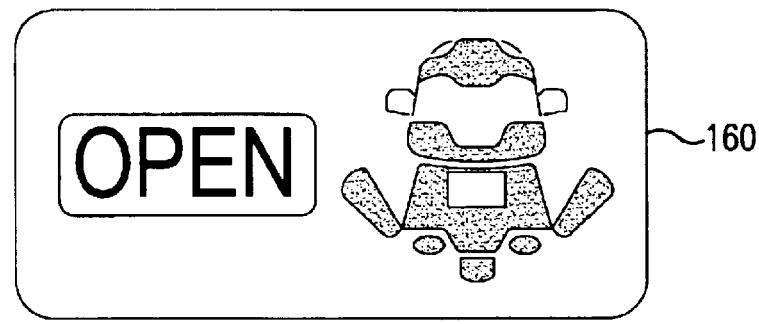
FIG. 17 is a display example (warning screen) of the sub-panel.
Figure 18:
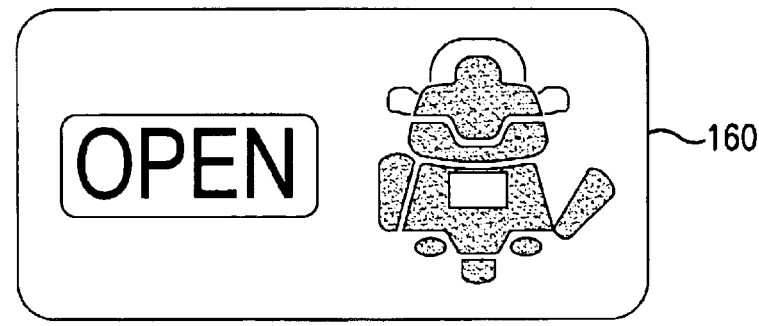
FIG. 18 is a display example (warning screen) of the sub-panel.

In this example, a sensor monitors whether or not each trunk cover is opened/closed. For example, when all the covers 220, 220L, and 220R are kept opened, the warning screen shown in FIG. 17 is displayed. When only the cover 220R of the right side trunk 210R is kept opened, the warning screen shown in FIG. 18 is displayed. Each warning screen can break into the display of the sub-panel 160 whether the navigation system is operating or not.

In this example, when the car 100 passes a preset way point, the driver can trace the predetermined running route simply by referring to the sub-panel 160. When passing a non-preset way point, however, the driver is requested to refer to the navigation unit 1 housed in the rear trunk 220 to obtain detailed information. Also in this case, the driver can enjoy comfortable touring without losing his/her way.

Furthermore, when image data photographed by the digital camera 22 during running is transferred to the navigation unit 1 and stored so as to be related to the position information, it becomes easier to arrange these image data in order at a later time.

As described above, also in this example, the system is provided with two display panels that share the main functions of the navigation system so that the sub-panel 160 of the vehicle displays only the minimum necessary information of the driver, thereby the display space can be minimized. On the other hand, the display panel 16 of the navigation unit 1 displays detailed map information, so that the driver can obtain both of rough and detailed information.

In each of the above examples, the present invention has applied to the buggy car 100 and the large auto-bicycle 200. However, the present invention may also apply to smaller vehicles, such as scooters, so long as the vehicle is provided with two display panels, one display panel being disposed in the driver's visual field, and the other being housed in the navigation box.

When the present invention applies to a scooter, the navigation unit 1 may be housed in a housing space secured under the driver's seat, which is also used as the cover of the driver's seat or in a pocket equivalent to the navigation box, provided at the driver's seat side in the leg shield block. Otherwise, the navigation unit 1 may be housed in a glove compartment disposed between the cowling extended from the front to the rear of the vehicle and the car body.

According to the present invention, the first display block space can be reduced. This is the result of the system having two display blocks that share the main functions of the navigation system, wherein the first display block displays only the minimum necessary information of the driver during running, and the second display block displays other and detailed information. Consequently, the first display block can be disposed in the visual field of the driver with no obstacles therebetween, and the second display block can display detailed information that will overflow the first display block.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle navigation system that displays route guidance information by receiving GPS satellite radio waves, comprising:

a navigation unit that generates said route guidance information;

a first display block that displays only part of said route guidance information; and a second display block, that displays every selected item of said route guidance information, wherein the first display block is part of a vehicle meter panel, and the second display block is a second display panel disposed outside of a visual field so that a driver cannot see the second display panel when driving said vehicle, and when the driver is not driving and the vehicle is stopped, the driver can see the second display panel, and wherein said navigation unit is a portable information terminal in which a navigation program is installed, and wherein said second display block is said display panel of said portable information terminal.

2. The vehicle navigation system according to claim 1, wherein said first display block is disposed within said visual field of the driver when driving said vehicle.

3. The vehicle navigation system according to claim 1, wherein said first display block displays at least either a distance of or a direction to a predetermined goal.

4. The vehicle navigation system according to claim 1, wherein said first display block and second display block share the main functions of the navigation unit and separately display said route guidance information.

5. The vehicle navigation system according to claim 1, wherein said route guidance information displayed on said second display block includes map information.

6. The vehicle navigation system according to claim 1, wherein said navigation unit is housed in a container with a cover.

7. The vehicle navigation system according to claim 6, wherein said container with a cover is fixed on or around a carrier of said vehicle.

8. The vehicle navigation system according to claim 6, wherein said container with a cover is an existing trunk provided at the rear or at a side of said vehicle.

9. The vehicle navigation system according to claim 6, wherein said container with a cover is a housing box provided under a seat of said vehicle and enabled to be used as said cover.

10. The vehicle navigation system according to claim 6, wherein said container with a cover is a leg shielding pocket with a cover, provided on the driver side wall of a leg shield extended downward from the handlebars of a scooter.

11. The vehicle navigation system according to claim 6, wherein said container with a cover is a glove compartment disposed between a cowling extended to the rear from the front of said vehicle and the body of said vehicle.

12. The vehicle navigation system according to claim 1, wherein said navigation unit is fixed at said vehicle so as to be removed mechanically and connected to said first display block so as to be turned on/off electrically.

13. The navigation system according to claim 1, wherein some of said route guidance information obtained in accordance with said navigation program is displayed concurrently in said first display block and said second display block.

14. A vehicle navigation system that displays route guidance information by receiving GPS satellite radio waves, comprising:
 a navigation unit that generates said route guidance information;
 a first display block that displays said route guidance information roughly; and
 a second display block that displays said route guidance information in detail, wherein the first display block is part of a vehicle meter panel, and the second display block is a second display panel disposed outside of a visual field of a driver when driving said vehicle,
 wherein part of the route guidance information displayed on the first display block is also displayed on the second display block.

15. The vehicle navigation system according to claim 14, wherein said first display block is disposed within said visual field of the driver when driving said vehicle.

16. The vehicle navigation system according to claim 14, wherein said navigation unit is a portable information terminal in which a navigation program is installed, and wherein said second display block is said display panel of said portable information terminal the first display block and the second display block both displaying at least either a distance of or a direction to a predetermined goal.

17. The vehicle navigation system according to claim 14, wherein said first display block and second display block share the main functions of the navigation unit and separately display said route guidance information.

18. The vehicle navigation system according to claim 14, wherein said route guidance information displayed on said second display block includes map information.

19. The vehicle navigation system according to claim 14, wherein said navigation unit is housed in a container with a cover.

20. A vehicle navigation system that displays route guidance information by receiving GPS satellite radio waves, comprising:
 a navigation unit that generates said route guidance information;
 a first display block that displays only part of said route guidance information; and
 a second display block that displays every selected item of said route guidance information,
 the first block being part of a vehicle meter panel, and the second display block being a second display panel disposed outside of a visual field of a driver when driving said vehicle for displaying information that overflows from the first display block,
 wherein said first display block and said second display block both display at least either a distance of or a direction to a predetermined goal.

* * * * *